Oct. 11, 1955  E. R. GOLDFIELD ET AL  2,720,595

X-RAY APPARATUS

Filed June 6, 1952

INVENTOR.
EDWIN R. GOLDFIELD
ROBERT J. STAVA
EDGAR J. BASTIN

BY Bates, Teare & McKean
Attorneys

United States Patent Office 2,720,595
Patented Oct. 11, 1955

2,720,595

X-RAY APPARATUS

Edwin R. Goldfield and Robert J. Stava, University Heights, and Edgar J. Bastin, Cleveland, Ohio, assignors to Picker X-Ray Corporation, Waite Manufacturing Division, Inc., Cleveland, Ohio, a corporation of Ohio Application June 6, 1952, Serial No. 292,178

7 Claims. (Cl. 250—71)

This invention relates to improvements in X-ray apparatus and more particularly to a mobile radiation responsive radiographic exposure control for an X-ray apparatus. This application is a continuation-in-part of our copending application Serial No. 85,686, filed April 5, 1949, entitled "X-ray Apparatus" now Patent No. 2,668,913.

The usual X-ray apparatus includes a fluoroscopic screen which may be carried by an arm mounted for movement by an operator for the purpose of scanning an area for pathology or abnormalities. When such an area is located, the fluoroscopic screen arm is held in a steady position for observation or exposure to a film. The film may be carried in a cassette which can be positioned on the screen arm to expose different portions of the fluoroscopic screen, and the film exposure is preferably controlled by means of a radiation sensitive element which responds to radiations in the exposure area to determine the exposure.

Accordingly, it is an object of this invention to provide a radiation responsive exposure control which may be positioned to and from a desired exposure area of a fluoroscopic screen.

Briefly, in accordance with this invention there is provided a fluoroscopic screen support having provision for receiving a film-loaded cassette for exposure to a designated screen area. A radiation exposure control is mounted on the screen support for direct or remotely controlled swinging movement to and from the desired exposure area of the screen.

Figure 1:
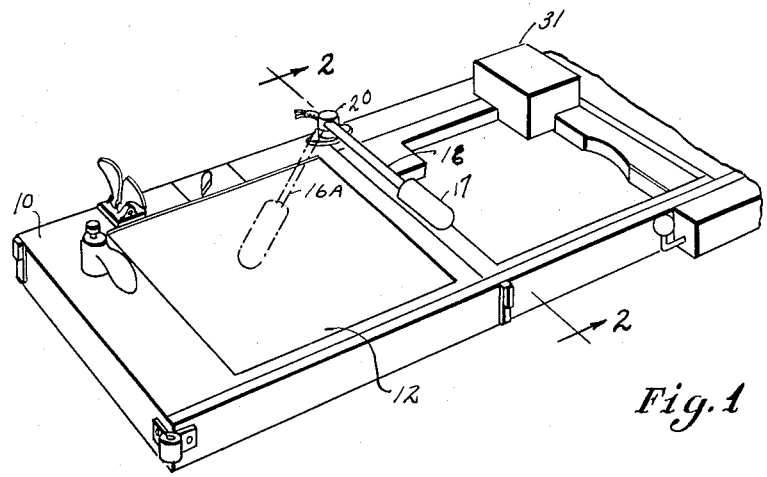
Fig. 1 is a perspective view of a fluoroscopic screen support having a radiation responsive exposure control mounted thereon for swinging movement relative to the screen.

The fluoroscopic screen supporting arm shown in Fig. 1 of the drawings constitutes a hollow frame 10 which may be movably mounted for pivotal and vertical positioning on a supporting column, not shown, relative to an X-ray patient supporting table. The hollow frame 10 is closed at the bottom with a plate and is partially closed at the top with a fluoroscopic screen 12, leaving a well therebetween for receiving a film-loaded cassette. The film cassette may be inserted into the well through the open portion of the hollow frame and may be moved to different positions relative to the fluoroscopic screen area for predetermined exposure patterns. Such positioning of the film cassette may be done by hand or automatically as shown and described in our copending application of which this is a continuation-in-part.

Figure 2:
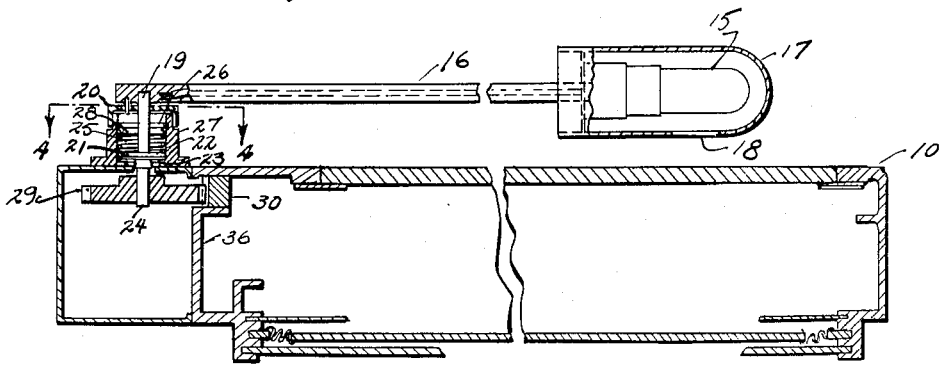
Fig. 2 is an enlarged section taken on a plane indicated by the lines 2—2 in Fig. 1.

As shown in Figs. 1 and 2 of the drawings, provision is made for supporting a radiation responsive exposure control which, in the preferred form illustrated in Fig. 2, constitutes a photo-timing tube 15 normally supported on the hollow frame 10 in a position where it will not interfere with fluoroscopic examinations, but where it can be positioned into scanning position relative to the screen 12 upon placing a film cassette into a desired exposure position for a radiographic examination. The tube 15 can be withdrawn from the scanning position after the radiographic examination is completed.

To accomplish the foregoing, the photo-timing tube 15 is shown as being carried by an arm 16, and as being disposed within a housing 17 which is provided with a scanning aperture 18. The arm 16 is hollow and carries wires which lead to the usual apparatus for controlling the timing of excitation of the X-ray tube. The arm 16 is mounted for swinging movement relative to the fluoroscopic screen 12 and preferably is fixed to a pin 19 which is journalled in a cap 20. In the preferred embodiment shown in Fig. 2, the pin 19 carries at its lower end a disc-like plate 21 which is adapted releasably to engage a disc 22 of friction material that is affixed to another disc 23, the latter of which is affixed to a drive shaft 24. The members 21, 22 and 23 form a slip-clutch, the tension on which is determined by a spring 25, one end of which bears against the plate 21 and the other end of which bears against a ring 26. The ring 26 is positioned within the housing 27 in any suitable way, such as by a retaining ring 28. The drive shaft 24 carries a gear 29 which is adapted to mesh with teeth on a rack bar 30 for remote control positioning of the tube.

Figure 3:
Fig. 3 is partial sectional view of the rack and pinion for positioning the radiation responsive exposure control.

In the preferred form shown in the drawings, an electrical motor is mounted within the housing 31 on the hollow frame 10 for reciprocating the rack bar 30 to position the photo-timing tube 15 by remote control. This is accomplished, as best shown in Fig. 3 of the drawings, by mounting a pinion 32 on the motor shaft 33 so that the pinion 32 engages rack teeth at the adjacent end of the rack bar 30. Thus, when the motor is remotely energized, the rack bar 30 positions the photo-timing tube into radiographic scanning position relative to the screen 10.

Figure 4:
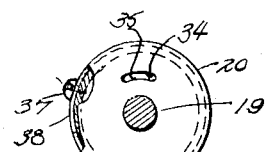
Fig. 4 is a section taken on a plane indicated by the lines 4—4 in Fig. 2 of the drawings.

The arrangement is such that whenever the film cassette is removed from the well of the hollow frame 10 to enable fluoroscopic examination through the screen 12, the photo-tube arm 16 may be placed in the full line position 16 of Fig. 1. However, when a film cassette has been positioned within the well of the hollow frame 10, the tube arm 16 may be directly or remotely swung into the position indicated by the dotted lines 16A in Fig. 1. Suitable means for automatically stopping the movement of the tube 15 in an extreme scanning position embodies a pin 34 which is carried by the arm 16 and which extends into a slot 35 in the cap 20, as best shown in Fig. 4 of the drawings. Angular adjustment may be obtained by means of a set screw 37 which is carried by the housing and extends through a slot 38 in the cap. Since the photo-tube 15 preferably occupies the same position relative to the screen for any film exposure, the tube can always be positioned in the correct scanning position notwithstanding the fact that the film cassette is capable of occupying different exposure positions throughout the fluoroscopic screen area. If desired, however, the extreme scanning position of the tube can be varied by the angular adjustment described.

Figure 5:
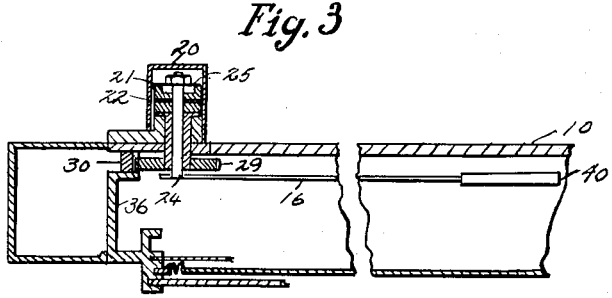
Fig. 5 is an enlarged section in the same plane as Fig. 2 showing a modified form where the radiation responsive exposure control is enclosed within the arm.

A modified form is shown in Fig. 5 of the drawings wherein the radiation responsive exposure control is mounted for swinging movement within the hollow well of the frame. With this arrangement, it is preferable to employ a control element of lesser size than the photo-timing tube shown in Fig. 2 of the drawings in order to accommodate the element within the well of the frame without interference with the film cassettes and screen. The element may be in the form of an ionization chamber or may be the equivalent of the type of elements known as the Ericson cell or the Omart cell. The latter type cells are similar in construction except that a crystal is used as an insulator between the control wire and outer casing in the Ericson type cell while a gas serves the same purpose in the Omart type cell. In either case, the insulating medium permits current to pass proportionate to the radiation striking the medium. The casing of the control element would preferably be constructed in the shape of a thin paddle 40 to minimize the space requirements and yet have sufficient area to scan a large enough field to assure averaging.

The swinging arm arrangement for the radiation responsive exposure control enables an operator to directly or remotely position the radiation responsive exposure control into and out of scanning position relative to the fluoroscopic screen area, depending upon whether radiographic or fluoroscopic examinations are being conducted.

We claim:

1. In an apparatus of the character described, a frame having a fluoroscopic screen carried thereby, an arm having a transverse member at one end freely journaled for rotation in the frame, and carrying a radiation responsive exposure control in spaced relation from said one end, a shaft rotatably mounted in the frame in spaced axial alignment with said transverse arm member, means drivingly engaging the shaft for rotation, and a clutch coacting between said shaft and transverse arm member to swing the arm and radiation responsive control into a predetermined scanning position relative to the fluoroscopic screen.

2. In an apparatus of the character described, a frame having a fluoroscopic screen carried thereby, an arm having a transverse pin at one end freely journaled for rotation in the frame, said arm carrying a radiation responsive exposure control in spaced relation from said transverse pin, a shaft rotatably mounted in the frame in spaced axial alignment from said pin, means for rotating the shaft, a slip-clutch coacting between adjacent ends of said shaft and pin to swing the arm and radiation responsive exposure control into a predetermined scanning position relative to the fluoroscopic screen, and stop means coacting between the arm and frame for limiting the swinging movement of said arm.

3. In an apparatus of the character described, a frame having a fluoroscopic screen carried thereby, an arm having a transverse pin at one end journaled for rotation in the frame, said arm carrying a radiation responsive exposure control in spaced relation from the pin, a shaft rotatably mounted in the frame in spaced axial alignment from said pin, means for rotating the shaft, a friction disc fixedly carried at the end of said shaft adjacent the pin, a cooperating disc loosely supported for axial movement along the pin, means resiliently urging said cooperating disc into mating contact with said friction disc to form a slip-clutch therebetween and swing said arm and radiation responsive exposure control into a predetermined scanning position relative to the fluoroscopic screen, and adjustable stop means coacting between the frame and arm to limit the swinging movement of said arm.

4. The apparatus of claim 3 wherein said means for rotating the shaft comprises a pinion fixed to the shaft and a cooperating rack, and means for reciprocating the rack to rotate the pinion and shaft.

5. In an apparatus of the character described, a hollow frame enclosure having a fluoroscopic screen enclosing a scanning opening and adapted to hold a film for exposure therein, an arm carrying a radiation responsive film exposure control member, means pivotally connecting one end of said arm to the frame adjacent the scanning opening for swinging movement across the screen, a rack and pinion carried by the frame for co-operative co-action with the pivotal connection to swing the arm into scanning position relative to the screen, means for selectively driving said rack and pinion, and an adjustable stop coacting therewith to limit the extent of arm movement.

6. In an apparatus of the character described, a hollow frame enclosure having a wall opening defining a scanning area and adapted to hold a film for exposure therein, a fluoroscopic screen enclosing the wall opening, a swingable arm having one end pivotally journaled in the frame within the enclosure and adjacent to the wall opening, a radiation responsive element for controlling the film exposure carried by the free end of said arm, said arm adapted to be moved across the scanning area within the enclosure and without interferring with the film or the screen, and selectively driven means co-acting with said arm through the pivotal connection to swing the arm to and from any position in the scanning area.

7. In an apparatus of the character described, a hollow frame enclosure adapted to receive and hold a film for exposure and having a fluoroscopic screen surmounting a film scanning opening therein, an arm having one end pivotally mounted on the frame adjacent the screen and carrying a radiation responsive film exposure control member at the other end, said arm and control member being spaced from the screen and frame for free swinging movement across the screen, and selectively driven means co-acting therewith to position the control member to and from any position in its path of travel across the screen.

References Cited in the file of this patent

UNITED STATES PATENTS

| | | |
|---|---|---|
| 581,199 | Easton | Apr. 20, 1897 |
| 1,891,227 | Friebus | Dec. 20, 1932 |
| 1,985,715 | Bucky | Dec. 25, 1934 |
| 2,121,211 | Padva et al. | June 21, 1938 |
| 2,398,904 | Libman et al. | Apr. 23, 1946 |
| 2,441,324 | Morgan et al. | May 11, 1948 |
| 2,499,990 | Dehmel | Mar. 7, 1950 |
| 2,539,196 | Marshall | Jan. 23, 1951 |

FOREIGN PATENTS

| | | |
|---|---|---|
| 593,764 | Great Britain | Oct. 24, 1946 |